(12) United States Patent
Kwiatkowski et al.

(10) Patent No.: US 11,030,814 B1
(45) Date of Patent: Jun. 8, 2021

(54) DATA STERILIZATION FOR POST-CAPTURE EDITING OF ARTIFICIAL REALITY EFFECTS

(71) Applicant: Facebook, Inc., Menlo Park, CA (US)

(72) Inventors: Marcin Kwiatkowski, San Francisco, CA (US); Mark I-Kai Wang, Palo Alto, CA (US); Mykyta Lutsenko, Menlo Park, CA (US); Miguel Goncalves, Redwood City, CA (US); Hermes Germi Pique Corchs, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 16 days.

(21) Appl. No.: 16/248,567

(22) Filed: Jan. 15, 2019

(51) Int. Cl.
    *G06T 19/00*     (2011.01)
    *H04N 5/272*     (2006.01)
    *H04N 5/92*     (2006.01)

(52) U.S. Cl.
    CPC .......... *G06T 19/006* (2013.01); *H04N 5/272* (2013.01); *H04N 5/9201* (2013.01)

(58) Field of Classification Search
    CPC combination set(s) only.
    See application file for complete search history.

(56) References Cited

U.S. PATENT DOCUMENTS

| | | | |
|---|---|---|---|
| 10,553,029 B1* | 2/2020 | Waggoner | G06T 19/006 |
| 2012/0327125 A1* | 12/2012 | Kutliroff | G06F 3/017 |
| | | | 345/660 |
| 2013/0314442 A1* | 11/2013 | Langlotz | H04N 5/23238 |
| | | | 345/633 |
| 2016/0291922 A1* | 10/2016 | Montgomerie | G09B 5/14 |
| 2018/0018861 A1* | 1/2018 | Locke | G06F 3/017 |
| 2018/0285052 A1* | 10/2018 | Eade | G06F 3/04815 |
| 2020/0051334 A1* | 2/2020 | Leung | G06T 19/006 |
| 2020/0094992 A1* | 3/2020 | Hoover | G06K 9/00469 |

* cited by examiner

*Primary Examiner* — Andrew G Yang
(74) *Attorney, Agent, or Firm* — Baker Botts L.L.P.

(57) ABSTRACT

In one embodiment, the system captures a video data stream of a scene and contextual data streams associated with the video data stream. The contextual data streams comprise a sensor data stream or a computed data stream. The system renders an artificial reality effect based on the contextual data streams for display with the video data stream. The system generates a serialized data stream by serializing data chunks of the video data stream and the contextual data streams. The system stores the serialized data stream into a storage. The system extracts the video data stream and one or more of the contextual data streams from the serialized data stream by deserializing the data chunks in the serialized data stream. The system renders the same or another artificial reality effect for display with the extracted video data stream based on the extracted contextual data streams.

20 Claims, 8 Drawing Sheets

DATA STERILIZATION FOR POST-CAPTURE EDITING OF ARTIFICIAL REALITY EFFECTS

TECHNICAL FIELD

This disclosure generally relates to artificial reality, and in particular, to serializing captured data for post-capture editing of artificial reality effects.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described here relate to a method of enabling an artificial reality device to generate richer and more complex AR effects for previously-captured scenes. For example, raw sensor data of the recording device or/and computed data related to the video content may be stored together with video data to enable world effects rendering (e.g., 3D effects, interaction effects, display effects, sound effects, lighting effects) and other editing on the post-capture videos. A mobile device may capture multiple streams of data (e.g., video data, raw IMU data, depth sensor data, temperature sensor data, audio data) and generate the computed data (e.g., face tracking data, person/object segmentation data, world tracking data, point cloud data) related to the content of the video. The device may serialize the multiple data streams (e.g., video streams, raw sensor data streams, computed data streams) into a single data stream based on time stamps associated with respective data chunks of the multiple data streams. The device then compresses and stores the serialized data stream for post-capture editing and world effect rendering at a later time (e.g., replaying) by the same or a different device.

The stored serialized data may be transmitted to other systems (e.g., servers, mobile devices) for replaying. A replaying device may extract the video data, the raw sensor data, and/or the computed data by decompressing and desterilizing the stored data. The replaying device may directly use these extracted data to render world effects, even those requiring sensor data, without regenerating the computed data. For example, a mobile device may record a video which includes a 3D virtual object rendered in the scene. The mobile device may serialize the video data, the IMU data of the device when recording, and the computed data (e.g., object detection) and store the serialized data to a server. A replaying device may download the serialized data from the server and replay the video while rendering the 3D virtual object or another 3D virtual object in the scene based on extracted IMU data and computed data. The replaying device may not need to regenerate the computed data for rendering this 3D virtual object world effect and therefore reduces power consumption and computational resource demands. When rendering dynamic world effects that are different from the effects generated when recording, the replaying device may replace any data stream with locally-captured raw sensor data or locally-generated computed data to enable different world effects. For example, a mobile device may record a video of a user interacting with an object in the scene through touch sensors of the device. The mobile device may serialize and store the touch sensor data with the video data. However, when another device replays the video, the replaying device may replace the touch sensor data with real-time touch sensor data of the replaying device to allow the user of the replaying device to interact with the object in scene.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
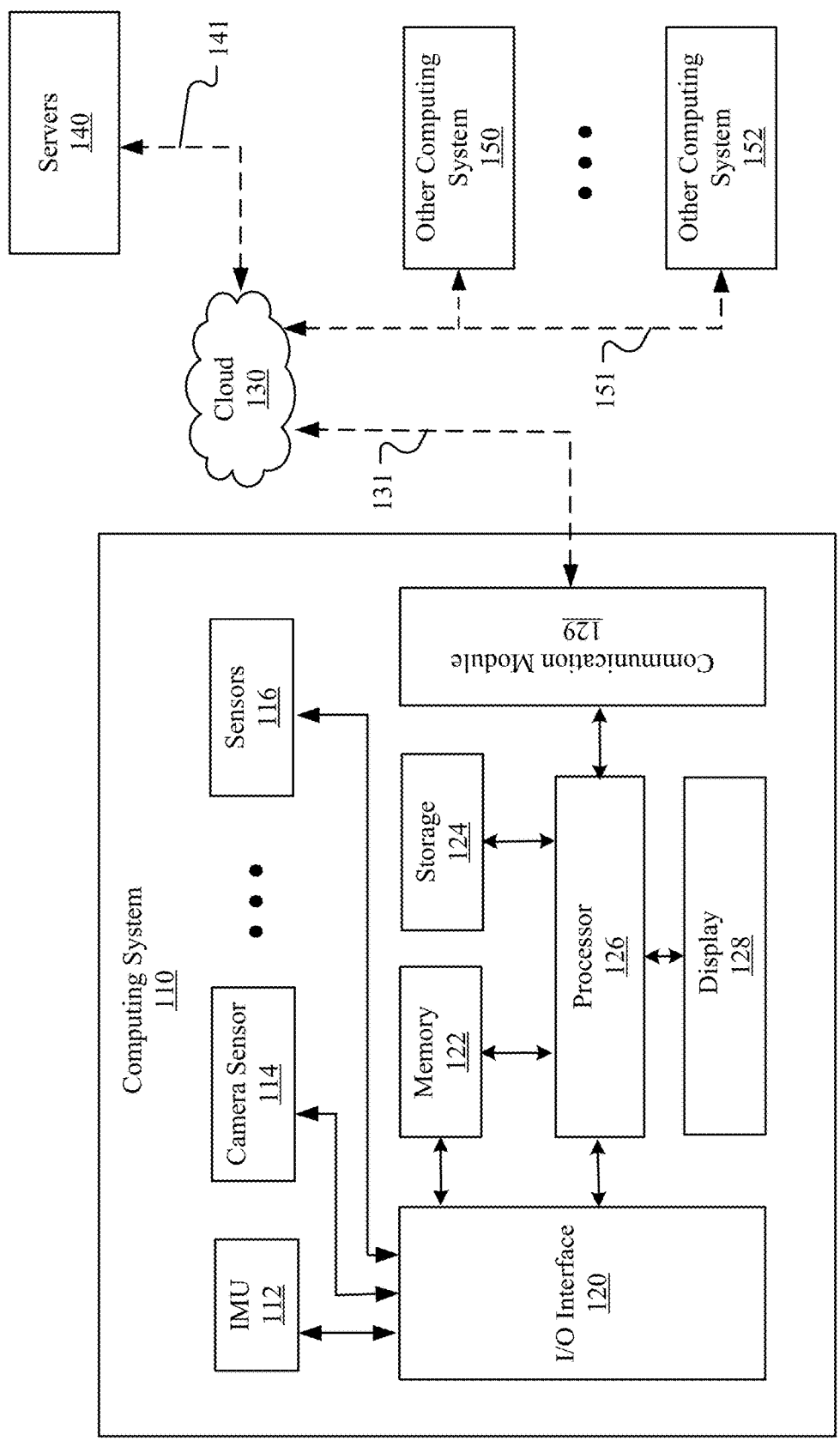
FIG. 1 illustrates an example artificial reality system.

The current existing artificial reality technologies have limitations and technical shortcomings for rendering artificial reality effects. For example, the previously existing AR devices may reply on live video streams, real-time sensor data (e.g., device position), or/and real-time computed data (e.g., face tracking) to render some artificial reality effects on the live video content. However, when pre-recorded videos are replayed, the replaying device may not have access to the real-time sensor data or computation resources to regenerate the computed data for rendering such artificial reality effects, and therefore cannot reproduce the artificial reality effects as rendered on the live video streams. Furthermore, even if the replaying device has computational resources to regenerate the computed data, doing so may consume large amount of battery power which is very limited for most mobile devices.

Particular embodiments of the system enable post-capture editing (e.g., adding, removing, replacing, editing, adjusting, interacting) of artificial reality effects on videos at a later time after being recorded by the system. The system may capture the video data stream (e.g., using a camera sensor) together with one or more contextual data streams which may include raw sensor data from one or more sensors (e.g., IMU, accelerometers, orientation sensors, touch sensors) of the system and computed data (e.g., face recognition data, object recognition data, world tracking data, point of cloud) based on the content and scene in the video data stream. The video data stream and contextual data steam may each include a number of data chunks and each data chunk may be associated with a timestamp. The system may serialize the data chunks of the video data streams and context data streams based on the associated timestamps. The system may compress and store the serialized data into storage to for post-capture editing by the system or other computing systems. Particular embodiments of the system may, at a later time, extract the video data stream and contextual data streams by decompressing and deserializing the compressed and serialized data in the storage. The system may render artificial reality effects on the extracted video data stream based on the extracted contextual data streams.

Particular embodiments of the system allow post-capture editing of artificial reality effects on the recorded videos in a way that is not possible in traditional AR or VR systems, and therefore provide richer and more complex artificial reality effects. Particular embodiments of the system allow artificial reality system with limited computational resource to reproduce artificial reality effects using recorded computed data (and avoiding regenerating the computed data). Particular embodiments of the system reduce the power consumption of the artificial reality system for rendering artificial reality effects on recorded videos by using the recorded computed data and avoiding regenerating the computed data. Particular embodiments of the system provide improvements on artificial reality effect quality (e.g., free of compression artifacts) by allowing the artificial reality effect to be reproduced based on record sensor data and computed data. Particular embodiments of the system provide more flexible architecture for editing artificial reality effects based on recorded contextual data (e.g., raw sensor data, computed data) or new contextual data (e.g., real-time sensor data) of current replaying systems in post-capture stage which is not possible in traditional artificial reality systems.

FIG. 1 illustrates an example artificial reality system 100. In particular embodiments, the system 100 may include one or more computing systems (e.g., 110, 150, 152) and one or more servers 140. In particular embodiments, the computing system may be a desktop computer, a laptop computer, a tablet computer, a mobile phone, a camera, an artificial reality headset, a wearable computing device, a portable computing device, a user terminal device, or any suitable computing system. The computing systems and the servers may be connected through a cloud 130. In particular embodiments, the computing system 110 may include one or more processors 126, a memory 122, a storage 124, a display 128, an input/output interface 120, a communication module 129, etc. In particular embodiments, the computing system 110 may include or be coupled to a number of sensors including, for example, but not limited to, an inertial measurement unit (IMU) 112 (which may include accelerometers, gyroscopes, motion sensors, velocity sensors, orientation sensor, etc.), one or more camera sensors 114, other sensors 116 (e.g. microphones, GPS sensors, light sensors, infrared sensors, distance sensors, position sensors, light sensors, touch sensors, stylus sensors, controller sensors, temperature sensors, gesture sensors, user input sensors, etc.). The computing systems (e.g., 110 151, 152) may be connected to the cloud 130 through wired or wireless connections (e.g., 131, 151) and may be connected to the servers 140 through the cloud 130 and a wired or wireless connection 141.

Figure 2:
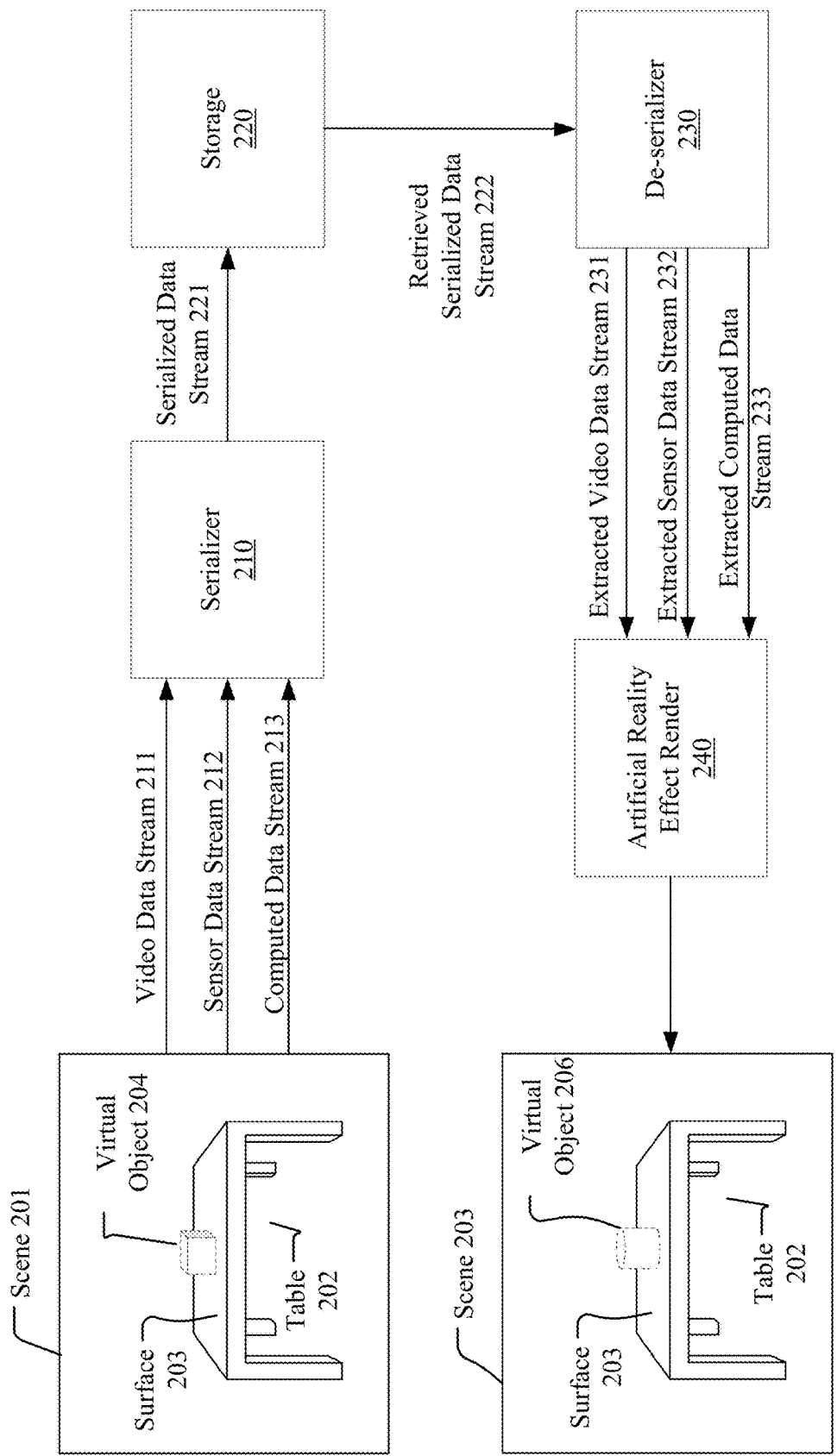
FIG. 2 illustrates an example framework for post-capture editing of artificial realty effect.

FIG. 2 illustrates an example framework 200 for post-capture editing of artificial realty effect. In particular embodiments, the computing system may capture a video data stream (e.g., 211) and one or more contextual data streams (e.g., sensor data stream 212, computed data stream 213) of a scene. For example, the computing system may capture a video data stream 211 of the scene 201 which includes a table 202. In particular embodiments, the video data stream 211 may be a raw video data stream or a video stream in any suitable formats as captured by a camera sensor. In particular embodiments, the sensor data stream 212 may include sensor data from one or more sensors associated with computing system, for example, IMU sensors, orientation sensors, motion sensors, velocity sensors, device position sensors, etc. The computing system may also use one or more microphones to capture the audio data stream associated with the video data stream 211. In particular embodiments, the computing system may generate one or more computed data streams 213 (e.g., object recognition data, object feature recognition data, face recognition data, face tracking data, etc.) based on the captured video data stream 211. For example, the computing system may use an object recognition algorithm to recognize the table 202, the surface 203, and other object features, such as, surfaces, corners, edges, lines, shapes etc. In particular embodiments, the computing system may render an artificial reality effect in the scene of the captured video stream. For example, the computing system may render a virtual object 202 on the surface 203 of the table 202. The rendered virtual object 202 and the captured video data stream may be displayed to a user on a display, such as, a screen, a head-mounted display, etc. The contextual data stream may include the artificial reality data (e.g., indication or identification of artificial reality effect) associated with the rendered artificial realty effect (e.g., virtual object 204).

In particular embodiments, the computing system may send the captured video data stream (e.g., 211) and contextual data streams (e.g., 212, 213) to a serializer 210 which may serialize the video data stream (e.g., 211) and the contextual data streams (e.g., 212, 213) into a serialized data stream 221. The serializer 210 may be implemented on the computing system. The computing system may store the serialized data stream 221 in a storage 220 (e.g., a local storage of the computing system, a cloud, a server, an associated storage, a storage of another computing system, etc.) for post-capture editing. In particular embodiments, the computing system may compress the serialized data stream 221 into a compressed formant before storing it in the storage 220.

In particular embodiments, a replay computing system may access and retrieve the serialized data stream 222 from the storage 220. The replay computing system may the same computing system which generated the serialized data stream or may be a different computing system. The replay computing system may extract one or more data streams (e.g., video data stream 213, sensor data stream 232, computed data stream 233) by using a de-serializer 230 which may de-serialize the retrieved serialized data stream 222 into one or more data streams (e.g., 231, 232, 233). The replay computing system may send the extracted data streams (e.g., 231, 232, 233) into an artificial reality render 240 which may render an artificial reality effect (e.g., virtual object 206) for display with the extracted video data stream. In particular embodiments, the replay computing system may reproduce the same artificial reality effect with the one being rendered when the video is being captured. In particular embodiments, the replay computing system may render another artificial reality effect different from the one being rendered when the video is captured. For example, the replay computing system may render a virtual object 206 on the surface 203 of the table 202 based on the extracted sensor data stream 232 and computed data stream 233. The virtual object 206 may be different from the virtual object 204 which was rendered when the video data stream and contextual data streams were captured. In particular embodiments, the replay computing system may render an artificial reality effect for display with the extracted video data stream based on the extracted contextual data streams (e.g., extracted data sensor stream 232, extracted computed data stream 233) without re-generating the computed data stream. In particular embodiments, the replay computing system may render artificial reality effect for display with the extracted video data stream based on newly generated sensor data stream (e.g., real-time user input sensor data for interacting with a virtual object) or re-computed data stream (e.g., re-computed tracking data, re-computed object recognition data).

In particular embodiments, the computing system may use a camera sensor to capture a video stream of a scene. The captured video stream may be raw video stream or in any suitable compressed or uncompressed video formats. The video formats may include, for example, but are not limited to, audio video interleave (AVI), flash video format (FLV), windows media video (WMV), QuickTime movie (MOV), moving picture expert group 4 (MP4), etc. In particular embodiments, the captured video data stream may be compressed by a live compression algorithm. The computing system may capture one or more contextual data streams associated with the video data streams including, for example, but not limited to, one or more sensor data streams (e.g., raw sensor data streams, IMU data, accelerometer data, gyroscope data, motion data, device orientation data), one or more computed data streams (e.g., face recognition data, face tracking points, person segmentation data, object recognition data, object tracking points, object segmentation data, body tracking points, world tracking points, optical flow data for motion, depth of scene, points in 3D space, lines in 3D space, surfaces in 3D space, point cloud data), one or more sound data streams, artificial reality effect data (e.g., indication or identification of the artificial reality effects rendered in the scene while the video being captured), etc. The captured video data stream and contextual data streams may be serialized and stored in a storage, which may be associated with the computing system, the cloud, the servers, or other computing systems, for post-capture editing or replaying. In particular embodiment, the serialized data stream may allow the recorded scene to be simulated or produced deterministically regardless of the type of computing systems that are used for replaying. In particular embodiments, the computer system may capture video data stream and the contextual data streams of a scene only without rendering artificial reality effects in the scene while capturing the video and contextual data streams.

Figure 3:
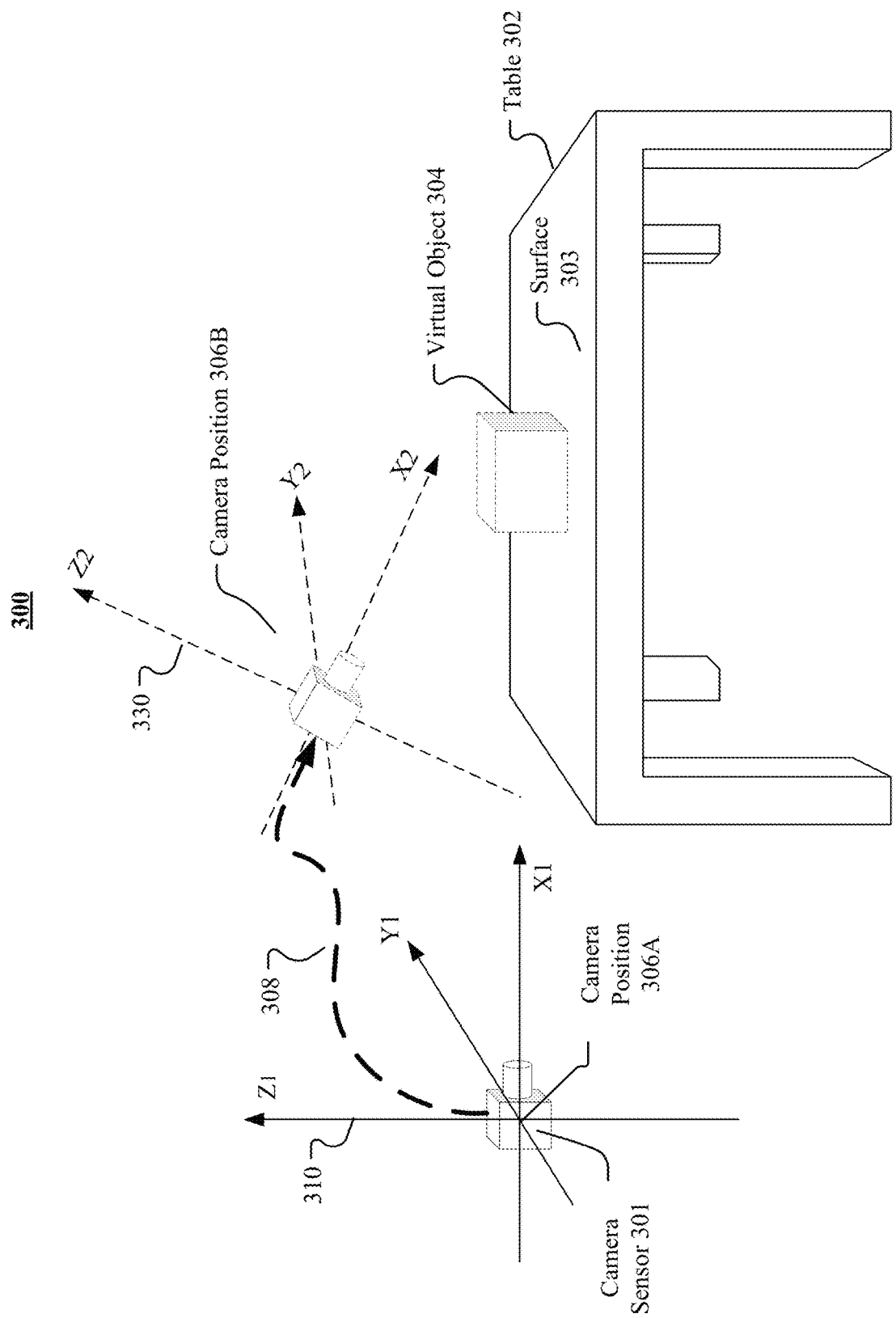
FIG. 3 illustrates an example scene for which a video data stream and contextual data streams are captured for post-capture editing.

FIG. 3 illustrates an example scene 300 for which a video data stream and contextual data streams are captured for post-capture editing. In particular embodiments, the computer system may render an artificial reality affect (e.g., a virtual object, a virtual character, a mask, a tag, a sound effect, a lighting effect, an interaction effect, etc.) for display with the captured video stream of the camera sensor while the video is being captured. The computing system may receive from a user an indication or identification indicating which artificial reality effect to be rendered. The computing system may render the artificial reality effect for display with the captured video stream based on the received indication or identification and one or more of the contextual data streams.

As an example and not by way of limitation, a user may use a computing system to capture and record a video of the scene 300 which includes a table 302. The computing system may have a camera sensor 301. The user may move around the table 302 while recording the video. The camera sensor 301 be initially at a first position 306A and may move to a second position 306B along a moving path 308 during the video recording process while the user walks around the table 302. During the video recording process, the computing system may display the captured video stream on a display (e.g., a display screen, a head-mounted display (HMD)) in real-time to the user. And, at the same time, the computing system may render an artificial reality effect for display with the captured video stream. For instance, the artificial reality headset may render a virtual 3D object 304 on the table 302 in the scene displayed by the computing system to the user. When the user looks at the scene displayed by the computing system, the user may see both the images of the real-world objects (e.g., the table 302) and the artificial reality effect (e.g., the virtual 3D object 304) rendered by the computing system.

In particular embodiments, the artificial reality effect may be rendered based on computed data generated by a tracking algorithm (e.g., object recognition algorithm, face recognition algorithm). The computed data may include, for example, but is not limited to, face recognition data, face tracking points, person segmentation data, object recognition data, object tracking points, object segmentation data, body tracking points, world tracking points, depth of scene, points in 3D space, surfaces in 3D space, point cloud data, optical field data for motion, etc. For example, the computing system may use an object recognition algorithm to identify the surface 303 of the table 302 and may render the virtual 3D object 304 on the surface 303 based on the object recognition data. As another example, the computing system may use a face recognition algorithm to identify and track a user face and render a virtual mask on the user face based on face recognition data. As another example, the computing system may use a tracking algorithm to track the relative position (e.g., distance, angle, orientation) of the surface 303 in the scene 300 to the camera sensor and may render the virtual object 304 on the surface 303 based on the relative position data (e.g., with different view angles).

In particular embodiment, the artificial reality system may be rendered based on the sensor data stream generated by one or more sensors associated with the computing system. The sensor data stream may be generated by one or more sensors of the computing system when the video is being captured or when the artificial reality effect is being rendered during a relaying process. In particular embodiments, the sensor data streams may generated by one or more sensors associated with the computing system including, for example, but not limited to, an inertial measurement unit (IMU), an accelerometer, a device orientation sensor, a motion sensor, a rotation sensor, a velocity sensor, a device position sensor, a microphone, a light sensor, a touch sensor, a stylus sensor, a controller sensor, a depth sensor, a distance sensor, a temperature sensor, a GPS sensor, a camera sensor, a gesture sensor, a user input sensor, a point cloud sensor, etc. For example, the virtual 3D object 304 may be rendered with different view angles to the user according to the camera sensor's position so that the virtual 3D object 304 may appear to be statically on the table 302 as viewed by the user from the display when the user moves around the table 302. As another example, an interaction effect (e.g., rotating, moving, lifting up, putting down, hiding, etc.) of the virtual 3D object 304 may be rendered by the computing system based on the real-time user inputs from one or more user input sensors (e.g., a touch sensor, a controller sensor, a moving sensor, an accelerometer, a microphone, a camera sensor, a gesture sensor or any suitable user input sensors). In particular embodiments, the sensor data stream may include information related to the camera sensor 301, for example and not limited to, position, orientation, view angle, distance to the real-world object (e.g., the table 302), depth of view, moving speed, moving direction, acceleration, etc. The sensor data stream may further include information related to lighting condition, sound, user inputs (e.g., through touch sensors, stylus sensors, controller sensors, etc.), temperature, location (e.g., through GPS sensor), etc.

Figure 4A:
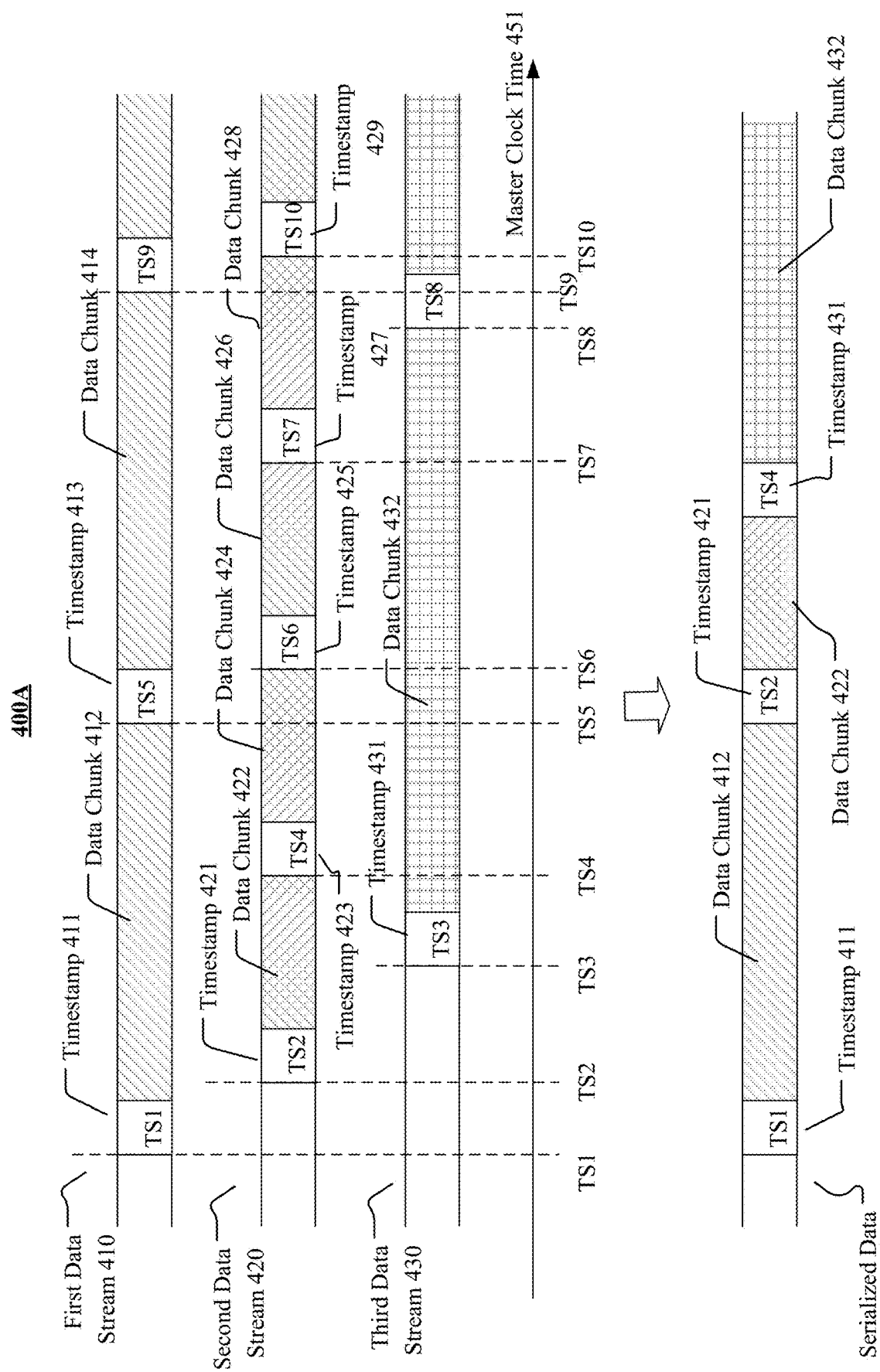
FIG. 4A illustrates an example process for serializing video data stream and contextual data streams.

FIG. 4A illustrates an example process 400A for serializing video data stream and contextual data streams. In particular embodiments, the computing system may capture multiple data streams, for example, video data stream, sensor data stream (e.g., IMU data), computed data stream, sound data stream, etc. In particular embodiments, the multiple data streams may be captured with different data rate or sampling frequency. For example, the IMU data stream may be captured at a data rate of 120 samples per second. As another example, the video data stream may be captured at a data rate of 30 or 60 frames per second. Each data stream may include a number of data chunks organized in a sequential order of time. Each data chunk may include a portion of the data stream and may be stored or/and transmitted separately. Each data chunk may include indication information for the associated data stream (e.g., indicating that the data chunk is from a video data stream, a sensor data stream, or a computed data stream). Each data chunk may be associated with a timestamp which may indicate the time when the data chunk is captured. In particular embodiments, the computing system may parallelly capture multiple data streams and may determine the timestamps for the data chunks of all captured data streams using the same clock (e.g., a master clock). Each data chunk may have a distinct timestamp from the other data chunks either from the same data stream or from different data stream. The clock used by the computing system to determine the timestamp may be a high-resolution clock (e.g., millisecond resolution) which can distinguish the time associated with different data chunks from the same data stream or different data streams even when the data chunks are captured close in time. A data stream may have its each data chunks stored separately (e.g., in different positions) in the serialized data stream and these data chunks may be extracted from the serialized data stream and re-assembled into the data stream based on the associated timestamps. The re-assembled data steam may have its data chunks organized in a sequential order which is the same to the order before the data stream being serialized into the serialized data stream.

In particular embodiments, the computing system may serialize multiple data streams (e.g., video data stream and contextual data streams) into a serialized data stream based on the timestamps associated with the data chunks from the multiple data streams. As an example and not by way of limitation, the computing system may capture three data streams (e.g., 410, 420, 430) which may have different sampling rates or frequencies. The computing system may use a master clock to determine the timestamps (e.g., 411, 413, 421, 423, 425, 427, 429, 431) for the data chunks (e.g., 412, 414, 422, 424, 426, 428, 432) from all three data streams (e.g., 410, 420, 430). The first data stream 410 may include the data chunk 412 associated with the timestamp 411, the data chunk 414 associated with the timestamp 413, and other data chunks. The second data stream 420 may include the data chunks of 422, 424, 426, and 428 which are associated with the timestamps of 421, 423, 425, 427, respectively. The third data stream 430 may include the data chunk 432 which is associated with the timestamp 431 and other data chunks. The computing system may determine each timestamp (e.g., 411, 413, 421, 423, 425, 427, 429, 431) based the master clock time when the corresponding data chunk is captured. The master clock may be a high-resolution clock (e.g., millisecond) which can distinguish the time of different data chunks from different data streams (even these data chunks are close in time) to allow each data chunk to have a distinct timestamp (e.g., TS1-10) along the master clock time 451.

In particular embodiments, the computing system may serialize the data chunks from multiple data streams to generate a serialized data stream. The data chunks from multiple data streams may be re-arranged into one data stream based on the associated timestamps. In particular embodiments, the data chunks from different data streams may be arranged in the sequential order of the timestamps to generate the serialized data stream. As an example and not by way of limitation, the data chunks of 412, 421, and 422 may be arranged in the sequential order of the corresponding timestamps of 411, 421, and 431 and may be assembled into the serialized data stream 440, as shown in FIG. 4A. In particular embodiments, the data chunks from different data steams may be arranged in an order different from the sequential order of the timestamps. As long as the data chunks are stored with the associated timestamps, the data chunks can be correctly re-assembled into the respective data streams during the deserialization process based on the associated timestamps.

In particular embodiments, the computing system may capture data streams in uncompressed formats, for example, raw video data stream, raw sensor data steam, etc. The computing system may serialize the uncompressed data stream into one serialized data stream in the uncompressed format and directly store the serialized data stream into a storage without compressing. In particular embodiments, the computing system may compress one or more captured data streams and serialize the data chunks in compressed formats into one data stream before storing the serialized data stream into the storage. For example, the computing system may only compress the video data stream which may have the largest data size among all data streams. The computing system may compress the video data stream using delta differencing method, H264 compression method, general compression method, or any suitable compression methods. The computing system may keep other data streams in uncompressed formats and may serialized the compressed video data stream and other uncompressed video data streams into one serialized data stream. In particular embodiments, the computing system may compress all data streams, for example, the video data streams, the sensor data streams, the audio data stream and the computed data streams. The computing system may compress the data steams using the same compression method or using different compression methods. In particular embodiments, the computing system may serialize the uncompressed data streams into one data stream and compress the serialized data stream into a compressed format before storing it into the storage. The serialized data stream in compressed formats may need less bandwidth for transmitting and need less storage space for storing than the serialized data stream in uncompressed formats. In particular embodiments, when one or more data streams are compressed, the computing system may mark the compressed data chunks (e.g., start and end points) from the serialized data stream. For example, one or more group of data chunks may be marked as the compressed data chunks among all the data chunks in the serialized data stream. The computing system may further store the compressing information (e.g., compressing method and parameters for each group of data chunks or each compressed data stream) which may be used to decompress the data during deserialization process.

In particular embodiment, when capturing data streams, the computing system may firstly store the captured data stream in a memory, for example, a high-speed memory, a random-access memory (RAM), a dynamic random-access memory (DRAM), a cache memory, a volatile memory, etc. After the serialized data stream is generated, the computing system may store the serialized data stream (e.g., compressed or uncompressed) into a storage (e.g., a non-volatile storage, a hard drive, a USB drive, an optical disk, a flash memory, etc.). The storage may be, for example, but is not limited to, a local storage of the computing system used for recording the video, a cloud storage, a storage of another computing system, a remote storage connected by internet, a storage connected by local network connection (e.g., Wi-Fi, Bluetooth, NFC), etc. For example, the serialized data stream may be stored in a hard drive of the computing system capturing all the data streams. The computing system may later access the stored data, deserialize one or more data streams, and replay the recorded video. The computing system may reproduce the same artificial reality effect or render another artificial reality effect different from the artificial reality effect rendered when the video is being captured. As another example, the serialized data may be transmitted to a cloud and stored on the server. The recording computing system or another computing system may download the stored data, deserialize one or more data streams, and replay the recorded video. The replay computing system may reproduce the artificial reality effect or render another artificial reality effect different from the one rendered when the video is being captured.

In particular embodiments, the computing system may use separate threads for writing data to the storage. The computer system may capture multiple data streams and buffer them in memory. For example, the computing system may buffer a number of video frames and a number of IMU reading in the memory. The data streams buffered in the memory may be stored in separate memory blocks. The computing system may read the data streams from the corresponding memory blocks and generate a serialized data stream by serializing the data chunks from these data streams. The computing system may arrange the data chunks from the data streams (e.g., the video data stream and the IMU data stream) based on timestamps associated with the data chunks. Then, the computing system may compress the serialized data stream and write the compressed serialized data stream to the storage. In particular embodiments, the stored serialized data stream may be configured allow easy expanding for adding additional data (e.g., additional data streams, additional serialized data streams, new sensor data streams from new types of sensors). The computing system may write additional or new data streams appending to the serialized data stream stored in the storage. In particular embodiments, the stored serialized data may include version data for version compatibility checking by a replay computing system. The version data may allow the replay computing system to selectively include or exclude particular data streams for extracting and replaying. The replay computing system may extract different data streams and different information based on the version information of a serialized data stream.

In particular embodiments, the computing system may repeat the writing process periodically with predetermined frequency (e.g., every one or two seconds). In particular embodiments, the computing system may repeat the writing process with a frequency depending on the memory size (e.g., used memory size, blank memory size, usable memory size) of the computing system. For example, the computing system may repeat this writing process in a higher frequency when a smaller memory size is left for usage in the computing system. Particular embodiments of the system reduce the memory consumption of the computing system by allowing the video and contextual data streams to be storage through serialization process using limited memory space (e.g., without crashing the computing system when the available memory space is low).

Figure 4B:
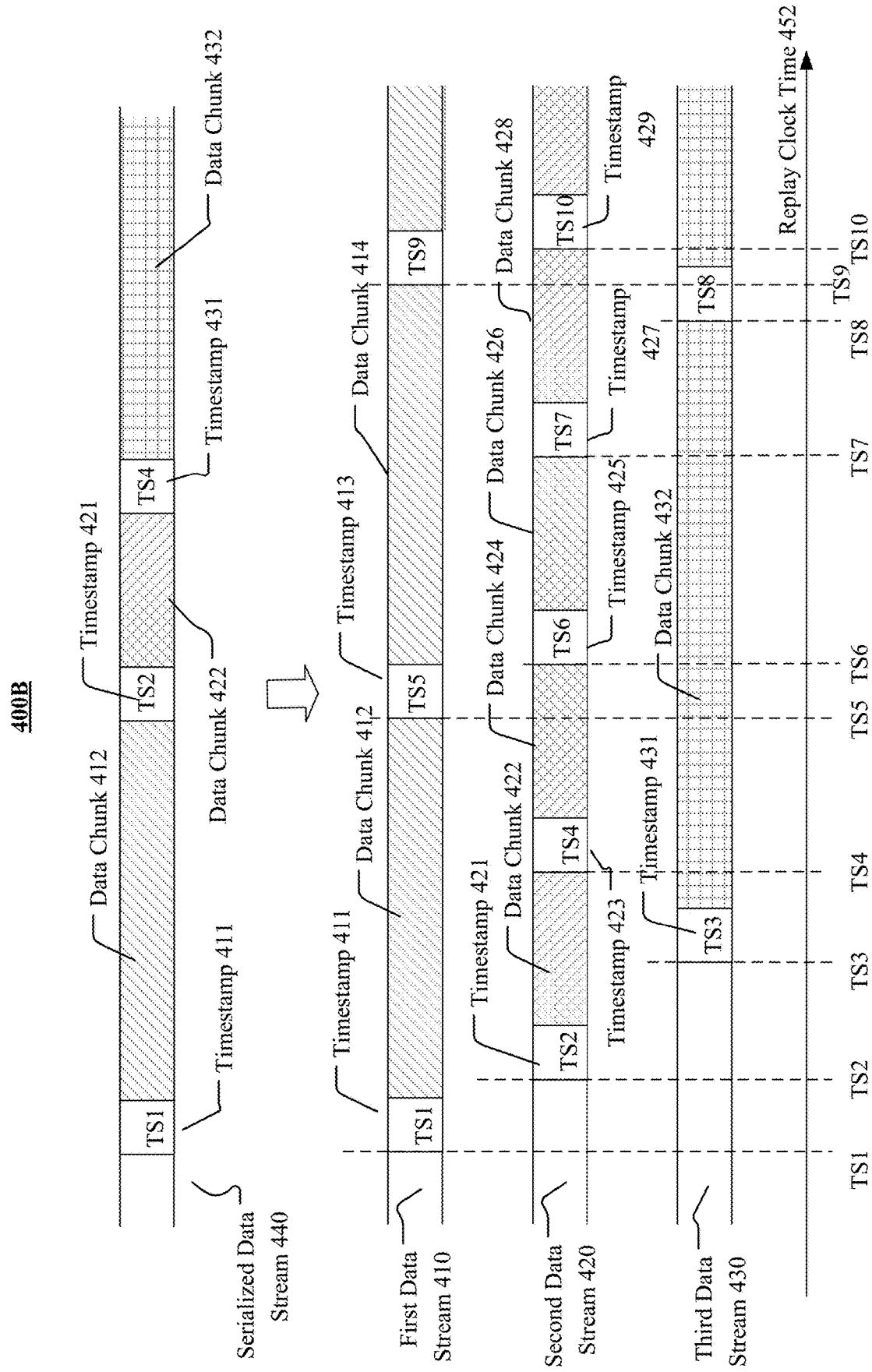
FIG. 4B illustrates an example process for de-serializing video data stream and contextual data streams.

FIG. 4B illustrates an example process 400B for deserializing video data stream and contextual data streams. In particular embodiments, the computing system may access/retrieve the serialized data stream stored in the storage and deserialize the data stream for replaying. As an example and not by way of limitation, the computing system may retrieve the serialized data stream 440 from the storage. The computing system may extract one or more data streams from the retrieved serialized data stream. For example, the computing system may extract a group of data chunks corresponding to each data stream to be extracted. Each extracted data chunk may be associated with a timestamp and may include association information indicating which data stream (e.g., video data stream, sensor data stream, computed data stream, audio data stream) the data chunk belongs to. The computing system may assemble the group of data chunks belonging to one data stream into the corresponding data stream based on the associated timestamps. For example, the data chunk 412 may be assembled into the first data stream 410 based on the timestamp 411 and the association information of the data chunk 412. As another example, the data chunk 422 may be assembled into the second data stream 420 based on the timestamp 421 and the association information of the data chunk 422. As another example, the data chunk 432 may be assembled into the third data stream 430 based on the timestamp 431 and the association information of the data chunk 432. Similarly, other data chunks (e.g., 414, 424, 426, 428) may be assembled to the corresponding data streams based on the corresponding timestamps (e.g., 413, 423, 425, 427) and the data chunk association information.

In particular embodiments, the computing system may re-assemble the data chunks into corresponding data streams based on the associated timestamps and correlate these timestamps to a replay clock time 452. Since different data streams may have different frequencies or sampling rates, the computing system may use the timestamps of the data chunks to synchronize different data streams for replaying. For example, the first, second, and third data streams (e.g., 410, 420, 430) may have starting timestamps of 411, 421, and 431, respectively, which may be used by the computing system to synchronize the three data streams (e.g., 410, 420, 430) for replaying. The re-assembled data streams may have their data chunks ordered along the replay clock time 452 in the sequential order (e.g., TS1-10) the same to the order when these data chunks were captured.

In particular embodiments, the computing system may extract one or more data streams from the serialized data stream. For example, the computing system may extract only the video data stream for replaying. As another example, the computing system may extract the video data stream and the sensor data stream from the serialized data stream and may use newly generated computed data for rendering artificial reality effects during replaying. As another example, the computing system may extract the video data stream and the computed data stream from the serialized data stream. The computing system may regenerate the computed data and compare the regenerated computed data with extracted computed data for comparing the tracking algorithm performance or/and tracking the algorithm regression.

In particular embodiments, the computing system may use specialized players to deserialize the serialized data stream and extract the data streams needed for replaying and post-capture editing. The specialized player may access the data chunks of each data stream and extract these data chunks from the serialized data stream. Then, the specialized player may assemble the data chunks into respective data streams and combine all data streams for replaying and post-capture editing. The computing system may choose one data stream (e.g., the video data stream or audio data stream) as the master stream for rendering artificial reality effects during replay process. Different data stream may have different sampling rates or frequencies. The computing system may distribute different data streams to an artificial reality render with different sampling rates or frequencies. For example, the computing system may distribute the IMU data to the artificial reality render with a frequency of 120 Hz and distribute the video data stream to the artificial reality effect render with a frequency of 30 Hz or 60 Hz. As another example, the computing system may send the IMU data to a world tracking algorithm with a frequency of 120 Hz for recomputing the tracking data.

In particular embodiments, the computing system may decompress the extracted data chunks if they are stored in compressed format. In particular embodiments, the computing system may decompress the serialized data stream before extracting any data streams if the serialized data stream is in a compressed format. In particular embodiments, the computing system may first extract the data streams from the serialized data stream and then decompress each extracted data stream when needed. In particular embodiments, the computing system may selectively include or exclude particular data streams from being extracted from the serialized data stream based on the needs for replaying and post-capture editing.

In particular embodiments, the computing system may render real-time artificial reality effects for display with live video stream or render artificial reality effects for display with video stream extracted from serialized data stream during replaying. In particular embodiments, the artificial reality effects rendered by the computing system may be rendered based on the sensor data stream (e.g., IMU data, motion data, position data) and may be refereed as world effects. In particular embodiments, the artificial reality effects rendered by the computing system may include, for example, but are not limited to, a virtual object (e.g., 2D or 3D objects), a virtual character (e.g., 2D or 3D virtual characters), a mask (e.g., 2D or 3D masks), a three-dimensional effect, an interaction effect, a displaying effect, a sound effect, a lighting effect, a virtual tag, etc. For example, the computing system may render a virtual gift in the scene of a recorded video based on the computing system' position and motion (e.g., from IMU data) relative to the scene during the recording process. The computing system may render an interaction effect of the virtual gift based on the user's interaction with the virtual gift (e.g., moving, rotating, lifting up, putting down) through one or more user input sensors (e.g., touch sensors, controller sensors, gesture sensors, motion sensors). As another example, the computing system may capture a video data stream for a room and render one or more virtual furniture in the room. The computing system may identify one or more surfaces in the scene and render the virtual furniture when the video is being captured or in post-capture stage after the video and contextual data streams have been recorded.

In particular embodiments, the artificial reality effects rendered by the computing system may be rendered based on computed data (e.g., face recognition data) computed based on the content of the video. For example, the computing system may render a 3D mask on a user's face based on the face recognition data. The computing system may render the 3D mask with different view angle while the computing system moves around the user's face based on the IMU data of the computing system. Examples of augmenting video data with one or more effects are disclosed in U.S. Patent Application Publication No. 2018/0097866 A1, entitled "Architecture for augmenting video data obtained by a client device with one or more effects during rendering" and filed 1 Oct. 2016 as U.S. patent application Ser. No. 15/284,292, which is incorporated herein by reference as examples only and not by way of limitation.

In particular embodiments, the computing system may render a first artificial reality effect for display with a live video stream while the video stream is being captured. For example, the computing system may render a virtual object in the scene of a live video stream and display the virtual object and the live video stream on a screen. During a replay process, a replay computing system may reproduce the first artificial reality effect for display with the video data stream extracted from the serialized data stream. For example, during the replay process, the replay computing system may render the same virtual object as the one that was rendered when the video is being captured. The replay computing system may be the computing system which recorded the video data stream and contextual data stream or may be another computing system different from the recording computing system. For example, the serialized data stream may be transmitted to another computing system (e.g., a server, another computing device such as a computer, a smartphone, a tablet, an artificial reality headset, etc.) for replaying and post-capture editing. The replay computing system may have an architecture different from the recording computing system. For example, a first mobile phone running on a first operating system (e.g., iOS) may record the video data stream and contextual data streams for post-capture editing. The recorded video and contextual data stream may be serialized and transmitted to another mobile phone which may run on a second operations system (e.g., Android, Linux) different from the first operation system. The second mobile phone may replay the recorded video as part of an automated offline test suite. During the replay process, the second mobile phone may reproduce the artificial reality effect that was rendered when the video and contextual data streams were being captured. In particular embodiments, the replay computing system may selectively extract one or more data streams from the serialized data stream and feed the extracted data streams into the artificial reality effect render. For example, the replay computing system may extract the video data stream and the sensor data stream and pass the sensor data stream to a world tracking algorithm or 3D tracking algorithm of the scene. As another example, the replay computing system may regenerate the computed data stream and compare the regenerated computed data stream to the extracted computed data stream for tracking algorithm regression.

In particular embodiments, the artificial reality rendered during the replay process may be rendered based on the sensor data stream (e.g., IMU data) and computed data stream (e.g., object recognition data) extracted from the serialized data stream. By using the serialized data stream, particular embodiments of the system may allow the replay computing system to access the sensor data (e.g., IMU data) associated with recording process and allow the replay computing system to reproduce the artificial reality effect or render new artificial reality effects based on the sensor data. By using computed data stream extracted from the serialized data stream, particular embodiments of the system provide an improved architecture to separate the video and contextual data from the tracking algorithms (e.g., object recognition algorithms). The replay computing system may not need to use a tracking algorithm to re-generate the computed data (which could be power consuming) for rendering artificial reality effects, and therefore reduces the power consumption and saves batter life. This architecture may allow the recorded video and contextual data stream to be transmitted to other computing systems for post-capture replaying or editing. For example, this architecture may enable a low-end computing system (which may not have enough computing power and memory to generate the computed data) to render artificial reality effects based on the computed data extracted from the serialized data. The low-end computing system may render artificial reality effect based on content features (e.g., depth of scene, objects, surfaces, edge, corners) in the scene of the video stream based on the extracted computed data. As another example, a first developer may use a computing system to transmit the serialized data stream to a replay computing system used by a second developer. The replay computing system may reproduce the scene based on the video data stream and contextual data streams in the serialized data stream. The reproduced scene may be exactly the same to the scene as seen by the first developer and may allow the second developer to have full understanding on the situation for debugging or fixing problems. As another example, the serialized data stream may be reencoded to exclude a portion of the contextual data streams. The reencoded serialized data stream may have a smaller size than the serialized data stream before reencoding. The reencoded serialized data stream may transmitted to the cloud or other computing system with reduced bandwidth requirement and may be stored in a smaller storage space.

In particular embodiments, the replay computing system may reproduce the artificial reality effect for display with the extracted video data stream based at least in part on a re-computed data stream. The replay computing system may use another tracking algorithm to re-compute the computed data based on the extracted video data stream. The replay computing system may have more computational resources (e.g., computing power, memory space, time) than the computing system generated the initial computed data. The tracking algorithm used by the replay computing system may have improved precision, accuracy, or efficiency comparing the tracking algorithm used for generating the initial computed data when the video was recorded. In particular embodiment, the replay computing system may use multiple tracking algorithms to generate multiple versions of computed data and select the one with the best precision for rendering the artificial reality effects. The replay computing system may improve the quality of the artificial reality effect by using the re-computed data.

In particular embodiments, the computing system for capturing the video and contextual data streams may not have the capability to generate the computed data when recording the video. For example, the computing system may be low-end device with limited computational power, memory space, or battery life for running the tracking algorithm. The computing system may only serialize the video data stream and sensor data stream without the computed data stream. In this case, when the serialized data stream is transmitted to another computing system for replaying, the replay computing system may run a tracking algorithm to generate the computed data based on the video data stream extracted from the serialized data stream. The replay computing system may render artificial reality effects based on the extracted sensor data stream and the computed data stream newly generated by the replay computing system.

In particular embodiments, the system may test and measure the performance (e.g., accuracy or/and speed) of different tracking algorithms by running or re-running these tracking algorithms on the same recording. The testing and measurement process may be performed by the recording computing system, a replay computing system, or a different computing system (e.g., a server). The computing system for testing and measurement may run different tracking algorithms to generate different versions of tracking data. The computing system may compare different versions of tracking data generated by different tracking algorithms to compare the accuracy or/and speed of these tracking algorithms. For example, the computing system may render artificial reality effects based on the tracking data generated by different tracking algorithms and compare the quality of the rendered artificial reality effects to determine which algorithm has better accuracy. The computing system may compare particular images with artificial effects rendered based on tracking data of different tracking algorithm. As another example, the computing system may record and compare the time spent by each tracking algorithm on generating corresponding tracking data and determine which tracking algorithm has faster speed. As another example, the computing system may measure the performance of a tracking algorithm by measuring both the time spent by the tracking algorithm to generate tracking data and the accuracy of generated tracking data. As another example, the system may measure and compare the performance of the tracking algorithms to historical performance data (e.g., previously runs on the same or different recording) and track the regression or improvement of the tracking algorithms.

In particular embodiments, the serialized data stream may be transmitted to a server for re-computing the tracking data. The server may run one or more tracking algorithms or run one tracking algorithm multiple times to generate multiple versions of tracking data. The server may compare different versions of tracking data (e.g., either by different tracking algorithms or by different runs of the same tracking algorithm) to compare the algorithm performance (e.g., accuracy and speed) and track algorithm regression. For example, the server may render artificial reality effects based on different versions of the computed data and compare the quality of the rendered artificial reality effects to detect regressions in the tracking algorithm(s). The server may also track the algorithm regression by comparing the aggregated tracking data or by comparing particular images with artificial effects rendered based on the tracking data. In particular embodiments, the server may use one or more machine-learning models and computer vision techniques to re-compute the tracking data to improve the quality of the tracking data. In particular embodiments, the server may generate a 3D point cloud for the scene in the video data stream. The 3D point generated by the server may be downloaded from the server and may be used by other computing systems which may not have the capacity for calculating point of cloud.

In particular embodiments, the replay computing system may reproduce the artificial reality effect or render another artificial reality effect based at least in part on a second sensor data stream which may a different sensor data stream form the one extracted from the serialized data stream. The second sensor data stream may be generated by the one or more sensors associated with the replay computing system while the artificial reality effect is being rendered for display with the extracted video data stream. For example, an interaction effect of a virtual 3D object may be rendered when the video data stream and contextual data streams are captured. The interaction effect may be rendered based on the sensor data associated with the recording process. The sensor data streams may include the IMU data (e.g., related to motion, rotation, position, distance) of the recording device and the user's input data (e.g., from touch sensors, gesture sensors, motion sensor, controller sensors) for interacting with the virtual 3D object. During the replay process, the replay computing system may render the virtual 3D object for display with the video data stream extracted from the serialized data stream. The replay computing system may receive one or more real-time user inputs from one or more user input sensors for interacting with the virtual 3D object. The replay computing system may render an interaction effect on the virtual 3D object based on the real-time sensor data received from the user of the replay computing system. For example, the interaction effect of the 3D object may be rendered based on touch sensor inputs received in real-time to allow the user to interact with the 3D object during the replay process.

In particular embodiments, the replay computing system may replace any contextual data stream in the serialized data stream with new contextual data stream for rendering artificial reality effects. This allows the videos with artificial reality effects to be recorded or generated incrementally. For example, the computing system may record a first video with an artificial reality effect by capturing and serializing the video data stream and contextual data stream. At a later time, the computing system may generate a second video by replacing one or more data streams in the serialized data stream of the first video. The computing system may repeat these steps and incrementally create a video with particular artificial reality effects. For example, the computing system may render a virtual character in the scene when recording the first video. Then, the computing system may replace the sensor data stream with new touch sensor inputs from the user for interacting with the virtual character. The computing system may incrementally replace the sensor data stream with new sensor inputs or add new sensor data streams (e.g., temperature sensor inputs, lighting sensor inputs, microphone inputs) for generating the final artificial reality effect.

In particular embodiments, the serialized data stream may be transmitted to a replay computing system. The serialized data stream may be configured to allow the replay computing system to extract the video data stream and one or more of the contextual data streams from the serialized data stream by deserializing the serialized data stream. The extracted video stream may be configured to allow the replay computing system to render a new artificial reality effect for display with the extracted video data stream. In particular embodiments, the replay computing system may render an artificial reality effect different from the initial artificial reality effect rendered during recording process. The new artificial reality effect may be rendered for display with the video data stream extracted from the serialized data stream. In particular embodiments, the replay computing system may render the artificial reality effect based on the sensor data stream and computed data stream extracted from the serialized data stream. In particular embodiments, the replay computing system may render the artificial reality effect based on a re-computed data stream. The re-computed data stream may be generated by the replay computing system using a tracking algorithm different from the one used for generating the initial computed data stream by the recording computing system.

In particular embodiments, the replay computing system may render a new artificial reality effect for display with the extracted video data stream based on at least on a new sensor data stream. The new sensor data stream may be generated by the one or more sensors associated with the replay computing system while the artificial reality effect is being rendered for display with the extracted video data stream. For example, an interaction effect of a virtual 3D object may be rendered based on the real-time sensor data received from the user of the replay computing system for interacting with the virtual 3D object. For instance, the interaction effect of the 3D object may be rendered based on touch sensor inputs received in real-time to allow the user to interact with the 3D object. In particular embodiments, the replay computing system may render a new artificial reality effect based at least in part on a re-computed data stream. The recomputed data stream may be generated by the replay computing system using a tracking algorithm which may be the same or different from the tracking algorithm used by the recording computing system to generate the initial computed data stream.

In particular embodiments, the computing system may capture and serialize the video data stream and the contextual data streams of a scene without rendering an artificial reality effect during the recording process. A replay computing system, which can be the recording computing system or a different computing system, may access the serialized data stream to extract the video data stream and the contextual data streams and may add artificial reality effects in the post-capture editing stage. As an example and not by way of limitation, the computing system may capture and serialize the video data stream and contextual data stream a scene which include a desk. At a later time, the computing system or another computing system may render a virtual object on the desk based on the video data stream and the contextual data streams extracted from the serialized data stream. The virtual object may allow a user to interact with it through one or more real-time user inputs (e.g., touch sensor inputs). As another example, a user may take a selfie image or video by capturing and serializing the video data stream and contextual data streams. In the post-capture stage, a replay computing system may render a mask on the selfie based on the face recognition data included in the computed data stream extracted from the serialized data stream. As another example, a first user may add a virtual gift to a recorded video in post-capture stage and send the serialized data stream to a second user. The second user may interact the virtual object that in the scene on a replay computing system which may render the virtual object based on the contextual data streams extracted from the serialized data stream. As another example, an entity may allow users to record video of places (e.g., office rooms, bedrooms, living rooms) by capturing and serializing the video data stream and the contextual data streams (e.g., IMU data stream, computed data stream). The entity may use a computing system to generate a number of virtual furniture for these places based on the contextual data streams extracted from the serialized data stream. The virtual furniture may be rendered for display with the video data stream extracted from the serialized data stream. When the recording devices have no capacity or less optimal capacity for calculating computed data (e.g., 3D scene data) for these places when recording the videos, the computing system used by the entity may generate the computed data (e.g., 3D scene data) based on the extracted video data stream. The virtual furniture may be rendered based on the extracted sensor data stream and the newly generated 3D scene data of these places.

Traditional artificial reality systems render virtual tags (e.g. location rags, stickers) in images or videos based on pixel-based region tracing and overlaying and do not really understanding the scene. Particular embodiments of the system enable rendering virtual tags in images or videos in post-capture stage based on the contextual data (e.g., sensor data, object recognition data, tracking data) of the scene. As an example and not by way of limitation, the computing system may generate a serialized data stream for a scene of an airport. The serialized data stream may include contextual data, such as, the sensor data and tracking data (e.g., object recognition data, region tracking data). The computing system may render one or more virtual tags (e.g., location tags) in the scene based on the contextual data. The virtual tags may be rendered in the first frame based on the object recognition or region recognition data and may be rendered in the later frames based on the motion data of the recording device (instead of trying to reposition the tag in each frame). This allows the rendered virtual tag to have more realistic 3D effect and appear more natural. For example, the computing system may identify a surface in the first frame of the scene of the extracted video data stream and render a virtual tag on the identified surface in that frame. For later frames, the computing system may determine a relative position of the camera sensor to the identified surface in the scene based on the sensor data stream in the extracted contextual data streams. Then, the computing system may render the tag on the surface of the scene with different view angles based on the determined relative position of the camera sensor to the identified surface in the scene.

Figure 5:
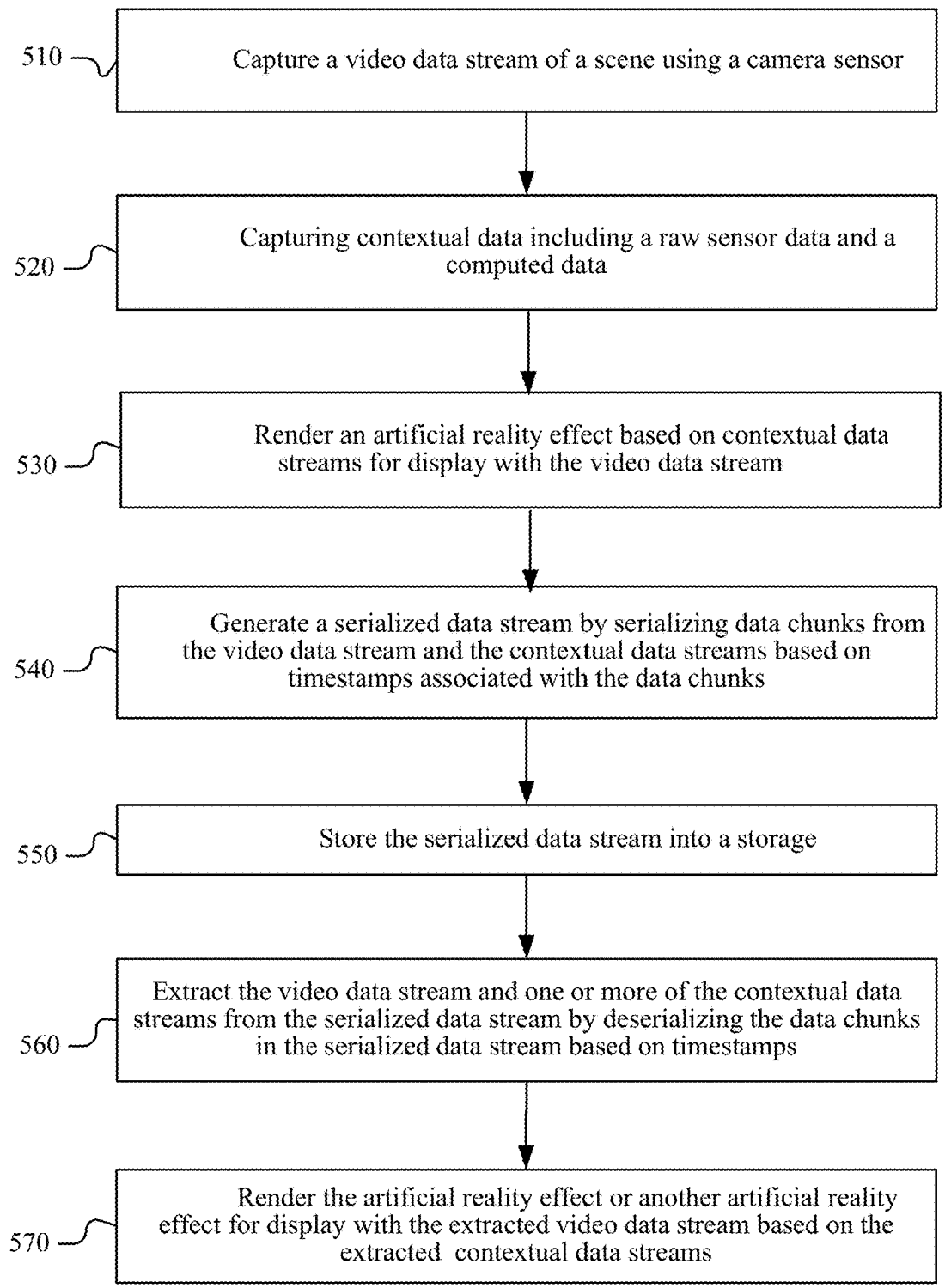
FIG. 5 illustrates an example method for serializing and de-serializing data streams for post-capture editing of artificial reality effects.

FIG. 5 illustrates an example method for serializing and deserializing data streams for post-capture editing of artificial reality effects. The method may start at step 510, wherein a computing system may capture a video data stream of a scene using a camera sensor. The captured video data stream may be a raw video data stream or a video data stream in any uncompressed or compressed formats. At step 520, the computing system may capture one or more contextual data streams associated with the video data stream. The one or more contextual data streams may include a sensor data stream or/and a computed data stream. The sensor data stream may be generated by one or more sensors associated with the computing system while the video data stream is being captured. The computed data stream may be generated by a tracking algorithm, such as, object recognition algorithm, face recognition algorithm, etc. At step 530, the computing system may render a first artificial reality effect based on the one or more contextual data streams for display with the video data stream. For example, the artificial reality effect may be rendered based on the sensor data stream or/and the computed data stream. At step 540, the computing system may generate a serialized data stream by serializing a plurality of data chunks of the captured data streams. For example, the plurality of data chucks may contain data from the video data stream and the one or more contextual data streams. Each data chunk may be associated with a timestamp indicating the time when that data chunk is captured or received. In particular embodiments, the computing system may use a high-resolution clock to determine a distinct timestamp for each data chunk from all data streams.

At step 550, the computing system may store the serialized data stream into a storage. In particular embodiments, the computing system may compress the serialized data stream before writing it to the storage. In particular embodiments, the storage may be a local storage of the computing system, an associated storage, a remote storage, a cloud, a server storage, a storage of another computing system, etc. At step 560, the computing system may extract the video data stream and one or more of the contextual data streams from the serialized data stream stored in the storage by deserializing the data chunks in the serialized data stream based on the associated timestamps. The computing system may re-assemble the extracted data chunks into corresponding data streams based on the timestamps associated with the data chunks and the data chunks association information (e.g., indicating which data stream a data chunk belongs to). At step 570, the computing system may render the first artificial reality effect or another artificial reality effect for display with the extracted video data stream based at least in part on the one or more of the extracted contextual data streams.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for serializing and deserializing data streams for post-capture editing of artificial reality effects including the particular steps of the method of FIG. 5, this disclosure contemplates any suitable method for serializing and deserializing data streams for post-capture editing of artificial reality effects including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
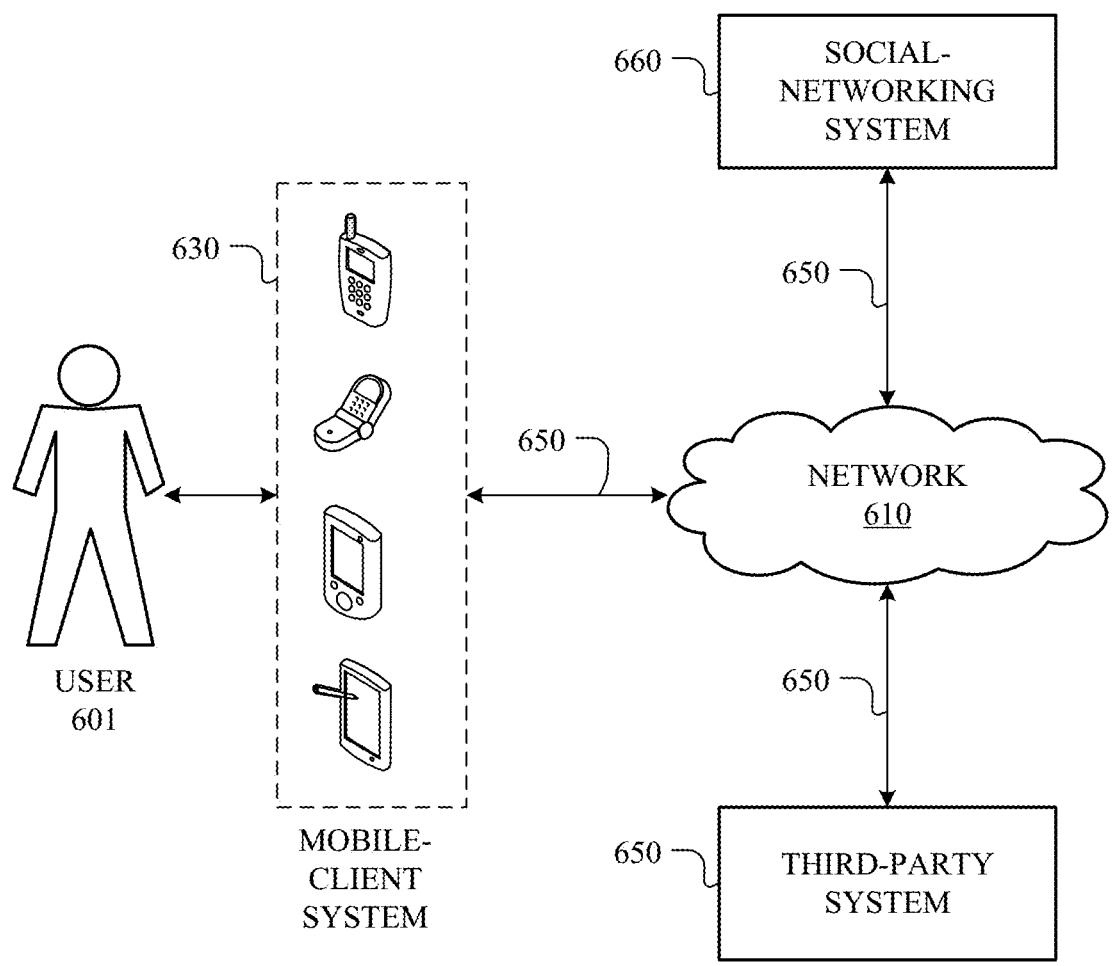
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
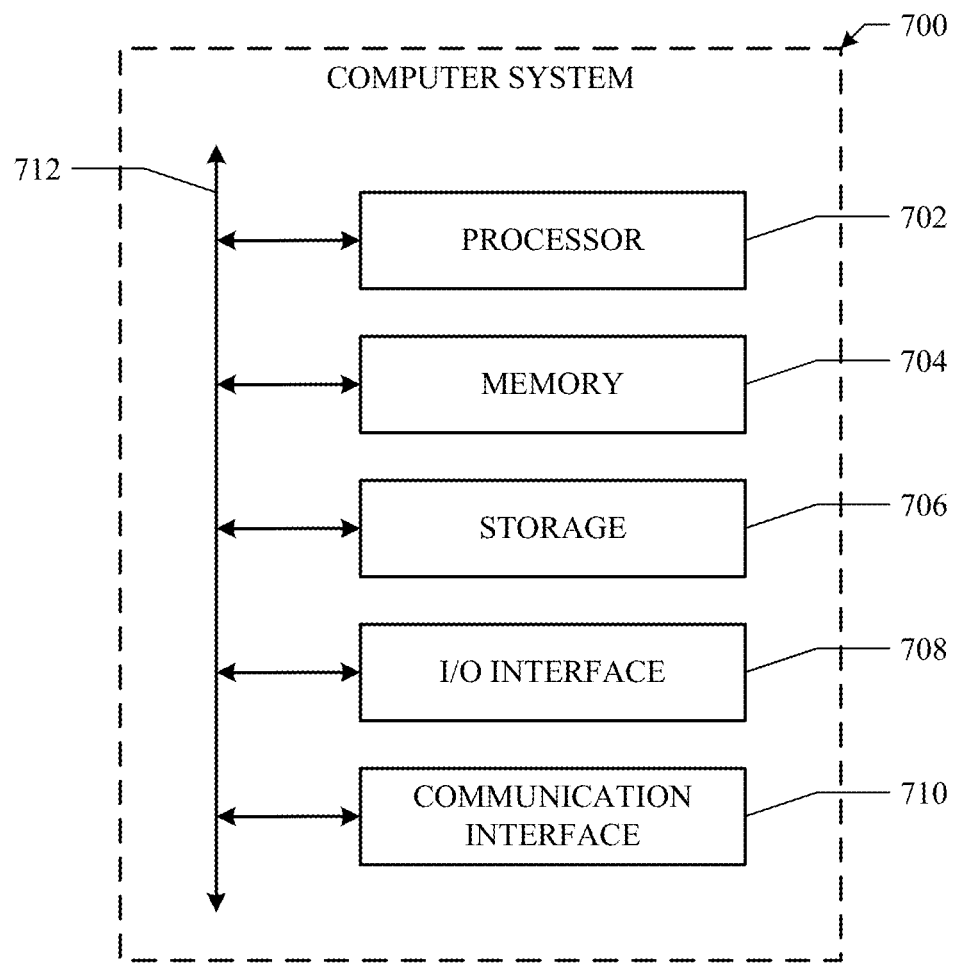
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first computing system:
   capturing, during a video capturing process, a video data stream of a scene using a camera sensor;
   capturing one or more contextual data streams associated with the video data stream, wherein the one or more contextual data streams comprise a first sensor data stream and a first computed data stream;
   rendering, during the video capturing process, a first artificial reality effect based on the one or more contextual data streams for display with the video data stream;
   generating a serialized data stream by serializing a plurality of data chunks, wherein the plurality of data chunks contains data from the video data stream and the one or more contextual data streams, and wherein each data chunk is associated with a timestamp;
   storing the serialized data stream into a storage;
   extracting, during a post-capture editing process at a later time after the video capturing process, the video data stream and one or more of the contextual data streams from the serialized data stream stored in the storage by deserializing the plurality of data chunks in the serialized data stream based on the associated timestamps;
   generating a second computed data stream based on the first sensor data stream in the extracted one or more of the contextual data streams;
   comparing the second computed data stream to the first computed data stream extracted from the serialized data stream to select a computed data stream from the first computed data stream and the second computed data stream based on one or more pre-determined criteria; and
   rendering the first artificial reality effect or another artificial reality effect for display with the extracted video data stream during the post-capture editing process based at least in part on the selected computed data stream.

2. The method of claim 1, wherein the serialized data stream is compressed before being stored into the storage.

3. The method of claim 1, wherein the first sensor data stream is generated by one or more sensors associated with the first computing system during the video capturing process while the video data stream is being captured, wherein the first computed data stream is generated by a first tracking algorithm, and wherein the second computed data stream is generated by a second tracking algorithm.

4. The method of claim 3, wherein the one or more pre-determined criteria comprise a computed data accuracy, and wherein the selected computed data stream provides a better computed data accuracy than the other computed data stream.

5. The method of claim 3, further comprising:
   selecting a tracking algorithm from the first tracking algorithm and the second tracking algorithm based on the selected computed data stream; and
   deploying the selected tracking algorithm to be used to compute subsequent computed data.

6. The method of claim 3, wherein the first artificial reality effect rendered for display with the extracted video stream is rendered based at least on a second sensor data stream, and wherein the second sensor data stream is generated by one or more sensors associated with the first computing system during the post-capture editing process while the first artificial reality effect is being rendered for display with the extracted video data stream.

7. The method of claim 3, further comprising:
   rendering, during the post-capture editing process, a second artificial reality effect for display with the extracted video data stream based on the first sensor data stream or the first computed data stream of the extracted contextual data streams.

8. The method of claim 3, further comprising:
   rendering, during the post-capture editing process, a second artificial reality effect for display with the extracted video data stream based at least in part on the selected computed data stream.

9. The method of claim 3, wherein the serialized data stream is transmitted to a second computing system, wherein the serialized data stream is configured to allow the second computing system to extract the video data stream and one or more of the contextual data streams from the serialized data stream by deserializing the serialized data stream during the post-capture editing process, and wherein the extracted video stream is configured to allow the second computing system to render a second artificial reality effect for display with the extracted video data stream during the post-capture editing process.

10. The method of claim 9, wherein the second artificial reality effect is rendered based at least in part on the first sensor data stream or the first computed data stream of the extracted contextual data streams.

11. The method of claim 9, wherein the second artificial reality effect is rendered based at least on a second sensor data stream, and wherein the second sensor data stream is generated by one or more sensors associated with the first computing system during the post-capture editing process while the second artificial reality effect is being rendered for display with the extracted video data stream.

12. The method of claim 9, wherein the second artificial reality effect is rendered based at least in part on the selected computed data stream.

13. The method of claim 1, wherein the first artificial reality effect comprises a three-dimensional object rendered in the scene on the extracted video data stream, further comprising:
receiving one or more real-time user inputs from one or more user input sensors of the first computing system for interacting with the three-dimensional object during the post-capture editing process; and
rendering an interaction effect associated with the three-dimensional object during the post-capture editing process in response to receiving the one or more real-time user inputs from the user input sensors.

14. The method of claim 1, further comprising:
identifying, during the post-capture editing process, a surface in the scene of the extracted video data stream;
determining, during the post-capture editing process, a relative position of the camera sensor to the identified surface in the scene based on the first sensor data stream in the extracted contextual data streams; and
rendering, during the post-capture editing process, a tag on the identified surface of the scene based at least on the determined relative position of the camera sensor to the identified surface in the scene.

15. The method of claim 1, further comprising:
reencoding, during the post-capture editing process, the serialized data stream to exclude a portion of the contextual data streams, wherein the reencoded serialized data stream has a smaller size than the serialized data stream before reencoding.

16. The method of claim 1, wherein the first computed data stream comprises one or more of:
face recognition data;
face tracking points;
person segmentation data;
object recognition data;
object tracking points;
object segmentation data;
body tracking points;
world tracking points;
optical flow data for motion;
a depth of scene;
a point in a three-dimensional space;
a line in a three-dimensional space;
a surface in a three-dimensional space; or
a point cloud.

17. The method of claim 1, wherein the first artificial reality effect comprises one or more of:
a virtual object;
a virtual character;
a mask;
a three-dimensional effect;
an interaction effect;
a displaying effect;
a sound effect;
a lighting effect; or
a tag.

18. The method of claim 1, wherein the first sensor data stream is captured by one or more sensors comprising one or more of:
an inertial measurement unit (IMU);
an accelerometer;
a device orientation sensor;
a motion sensor;
a velocity sensor;
a device position sensor;
a rotation sensor;
a microphone;
a light sensor;
a touch sensor;
a stylus sensor;
a controller sensor;
a depth sensor;
a distance sensor;
a temperature sensor;
a GPS sensor;
a camera sensor;
a gesture sensor;
a point of cloud sensor; or
a user input sensor.

19. One or more computer-readable non-transitory storage media embodying software that is operable when executed to:
capture, during a video capturing process, a video data stream of a scene using a camera sensor;
capture one or more contextual data streams associated with the video data stream, wherein the one or more contextual data streams comprise a first sensor data stream and a first computed data stream;
render, during the video capturing process, a first artificial reality effect based on the one or more contextual data streams for display with the video data stream;
generate a serialized data stream by serializing a plurality of data chunks, wherein the plurality of data chunks contains data from the video data stream and the one or more contextual data streams, and wherein each data chunk is associated with a timestamp;
store the serialized data stream into a storage;
extract, during a post-capture editing process at a later time after the video capturing process, the video data stream and one or more of the contextual data streams from the serialized data stream stored in the storage by deserializing the plurality of data chunks in the serialized data stream based on the associated timestamps;
generate a second computed data stream based on the first sensor data stream in the extracted one or more of the contextual data streams;
compare the second computed data stream to the first computed data stream extracted from the serialized data stream to select a computed data stream from the first computed data stream and the second computed data stream based on one or more pre-determined criteria; and
render the first artificial reality effect or another artificial reality effect for display with the extracted video data stream during the post-capture editing process based at least in part on the selected computed data stream.

20. A system comprising:
one or more non-transitory computer-readable storage media embodying instructions; and
one or more processors coupled to the storage media and operable to execute the instructions to:
   capture, during a video capturing process, a video data stream of a scene using a camera sensor;
   capture one or more contextual data streams associated with the video data stream, wherein the one or more contextual data streams comprise a first sensor data stream and a first computed data stream;
   render a first artificial reality effect based on the one or more contextual data streams for display with the video data stream;
   generate a serialized data stream by serializing a plurality of data chunks, wherein the plurality of data chunks contains data from the video data stream and the one or more contextual data streams, and wherein each data chunk is associated with a timestamp;
   store the serialized data stream into a storage;
   extract, during a post-capture editing process at a later time after the video capturing process, the video data stream and one or more of the contextual data streams from the serialized data stream stored in the storage by deserializing the plurality of data chunks in the serialized data stream based on the associated timestamps;
   generate a second computed data stream based on the first sensor data stream in the extracted one or more of the contextual data streams;
   compare the second computed data stream to the first computed data stream extracted from the serialized data stream to select a computed data stream from the first computed data stream and the second computed data stream based on one or more pre-determined criteria; and
   render the first artificial reality effect or another artificial reality effect for display with the extracted video data stream during the post-capture editing process based at least in part on the selected computed data stream.

* * * * *